United States Patent Office 3,499,965
Patented Mar. 10, 1970

3,499,965
7α - LOWER ALKYLTHIO - 17β - HYDROXY - 17α-METHYL - 5α - ANDROSTANO[3,2 - c]PYRAZOLE AND NOVEL INTERMEDIATES USEFUL IN THE PREPARATION THEREOF
Hidehiko Kaneko and Yuzuru Yamato, Minoo-shi, Osaka-fu, and Keiji Nakamura, Amagasaki-shi, Japan, assignors to Dainippon Pharmaceutical Co., Ltd., Osaka, Japan, a corporation of Japan
No Drawing. Continuation-in-part of application Ser. No. 528,809, Feb. 21, 1966. This application Nov. 1, 1966, Ser. No. 591,134
Claims priority, application Japan, Mar. 3, 1965, 40/12,294; Sept. 30, 1966, 41/64,704
Int. Cl. C07c 173/10; A61k 17/06
U.S. Cl. 424—241                    8 Claims

ABSTRACT OF THE DISCLOSURE

7α - lower alkylthio - 17β - hydroxy-17α-methyl-5α-androstano[3,2-C] pyrazoles are prepared by reduction of a 7α - lower alkylthio - 17β-hydroxy-17α-methyl-4 androstan-one with lithium in liquid ammonia thereby producing a 7α - lower alkylthio - 17β-hydroxy-17α-methyl-5 α-androstan-3-one. These novel intermediates are reacted with an alkyl formate in the presence of a strong base in a non-polar solvent with the production of 7α-alkylthio-17β - hydroxy - 2 - hydroxymethylene - 17α - methyl - 5α-androstan-3-ones.

These second intermediates are converted to the corresponding 7α - alkylthio - 17β - hydroxy-17α-methyl-5α-androstano[3,2-C]pyrazoles by reaction with hydrazine hydrate in ethanol.

The final products have interesting pharmacological properties, with anabolic activity superior to 17β-hydroxy-17α - methyl - 5α - androstano[3,2 - C]pyrazole and 17-methyltestosterone with lessened side effects and lowered acute toxicity.

SUMMARY OF THE INVENTION

This is a continuation-in-part of our application Ser. No. 528,809, filed Feb. 21, 1966 and now abandoned. This invention relates to new steroid compounds and intermediates useful in the preparation thereof. More particularly, the invention relates to 7α-lower alkylthio-17β-hydroxy-17α-methyl-5α-androstano [3,2 - C] pyrazoles which possess superior anabolic activity, as well as novel intermediates useful in the preparation thereof, namely, 7α-lower alkylthio-17β-hydroxy-17α-methyl-5α-androstan-3-ones and 7α - lower alkylthio - 17β - hydroxy - 2 - hydroxymethylene - 17α - methyl - 5α - androstan - 3 - ones.

The lower alkyl radicals in these compounds have from 1 to 4 carbon atoms.

Heretofore, it has been known that testosterone and androsterone have an anabolic activity, but they also have an androgenic activity. Therefore, when they are used as an anabolic agent, they show the undesirable androgenic activity. Efforts have therefore been made to find a new steroid compound showing enhanced anabolic activity with less androgenic activity. It has been reported by R. E. Schaub et al. that the original anabolic activity of a steroid compound was reduced by introducing alkylthio radical at C-7 of the steroid. [R. E. Schaub, M. J. Weiss; J. Org. Chem., vol. 26, page 3915 (1961)]. See also Schaub et al. U.S. Patent No. 3,074,932. The anabolic activity of some steroid compounds is increased by introduction of a pyrazole ring attached to A-ring. [R. O. Clinton et al.; J. Am. Chem. Soc., vol. 83, page 1478 (1961)].

According to the present invention, it has been unexpectedly found that 7α-lower alkylthio-17β-hydroxy-17α-methyl-5α-androstano [3,2-C] pyrazoles show superior anabolic activity when administered orally and subcutaneously. These compounds possess, therefore, a more favorable ratio of anabolic to androgenic activity than that of the parent 7α-lower alkylthio steroid compounds.

However, although some analogues of the compounds of this invention have been known, for example, in Schaub et al. U.S. Patent No. 3,074,932 cited above, the compound 17β-hydroxy-7α-methylthio-5α-androstano [3,2-C] pyrazole disclosed in that patent which is most analogous to the compound of the present invention showed little anabolic activity when it was administered orally in comparative tests.

Although it has been generally known that 17-alkylated steroid compounds impair liver and kidney functions when administered in human, nevertheless the compounds of the present invention do not show such undesirable side effects.

More particularly, it has been found that the compounds of the present invention have a stronger nitrogen retention activity than the other known anabolic steroids.

The distinct superiority in the anabolic activity of the compounds of the present invention is disclosed in detail hereinafter.

In the comparative tests for anabolic activity, 17β-hydroxy-17α-methyl-5α-androstano [3,2 - C] pyrazole, which has a structure broadly analogous to that of the compounds of the present invention and which has been known as a superior oral anabolic agent, and 17α-methyltestosterone, which has been known as an oral anabolic agent, are used as control agents.

Myotrophic and androgenic activity

The assay for myotrophic and androgenic activity was performed according to the modified method of Hershberger et al. [K. Nakamura et al.: Jap. J. Pharmacol., vol. 14, pages 138–149 (1964)].

Male Sprague Dawley rats, 4–5 weeks old, were used. The animals were castrated under ether anaesthesia and the oral treatment with test compounds dissolved into a steroid suspension solution of SV-No. 17874 (a standard solvent of the United States Public Health Service) was started on the day of castration and lasted for seven consecutive days. The test compounds were administered in doses of 0.2, 0.5, 1.0, 2.0 and 4.0 mg./100 g. body weight/day. The animals were killed under ether anaesthesia during the 8th day and the weight of levator ani muscle, ventral prostate and seminal vesicles were determined.

The increase in the weight of the levator ani muscle was used as the indication of myotrophic activity. The androgenic activity was determined from the increase of the weight of the ventral prostate and seminal vesicles, and was expressed as the geometrical mean value of the two. The relative potencies were estimated graphically. These comparative results are shown in Table I, in which the results were calculated by the parallel line assay method.

TABLE I

| Test compound | No. of rats | Myotrophic activity | Androgenic activity | Myotrophic/ androgenic |
|---|---|---|---|---|
| 7α-ethylthio-17β-hydroxy-17α-methyl-5α-androstano [3,2-C] pyrazole | 25 | 25.9 | 0.09 | 288 |
| 17β-hydroxy-17α-methyl-7α-methylthio-5α-androstano [3,2-C] pyrazole | 25 | 20.9 | 0.11 | 190 |
| 17β-hydroxy-17α-methyl-7α-n-propylthio-5α-androstano [3,2-C] pyrazole | 25 | 11.0 | 0.13 | 85 |
| 17β-hydroxy-7α-isopropylthio-17α-methyl-5α-androstano [3,2-C] pyrazole | 25 | 11.7 | 0.11 | 106 |
| 7α-n-butylthio-17β-hydroxy-17α-methyl-5α-androstano [3,2-C] pyrazole | 25 | 9.9 | 0.10 | 99 |
| 17β-hydroxy-17α-methyl-5α-androstano [3,2-C] pyrazole | 25 | 7.5 | 2.5 | 3.0 |
| 17α-methyltestosterone | 25 | 1 | 1 | 1 |

Nitrogen retention activity

The nitrogen retention activity was examined using male castrated matured rats 20 weeks old. The animals were given a liquid diet with or without addition of the steroid in a metabolic cage. Urinary nitrogen was assayed every day. As summarized in Table II, the representative compound of the present invention, 7α-ethylthio-17β-hydroxy-17α-methyl-5α-androstano [3,2-C] pyrazole, showed inhibition of urinary excretion of total nitrogen, thus indicating strong nitrogen retention.

It is thus shown that the compounds of the present invention have distinctly superior anabolic activity as compared to 17β-hydroxy-17α-methyl-5α-androstano [3,-2-C] pyrazole and 17α-methyltestosterone.

In addition, the compounds of the present invention have the least undesirable side effects, which the known anabolic steroid compounds have generally shown, such as an androgenic activity and depressions of pituitary, kidney and liver functions.

The acute toxicity of the compounds of the present invention is very low; for example $LD_{50}$ of the representative compound of the present invention, 7α-ethylthio-17β-hydroxy-17α-methyl-5α-androstano [3,2-C] pyrazole, is 1,050 mg./kg. in male mice and 2,084 mg./kg. in female mice.

The subacute toxicity of the compounds of the present invention was also determined using 17α-methyltestosterone as the control. Female and male Danryu rats, 7 weeks old, were used. The test compounds were administered orally with laboratory chow (CLEA, CE–2) in doses of 0.1, 1.0 and 10.0 mg./kg./day for 4 consecutive weeks and the influences on body weight, organ weight, endocrine gland weight, blood picture and leucocyte differential were observed, and macro- and microscopical examinations of the tissues were performed. In this manner, it was determined that hypertrophy of seminal vesicle and ventral prostate, and atrophy of pituitary, adrenal, ovary and uterus was observed only in the case of the control drug 17α-methyltestosterone. The compounds of the present invention showed only a few instances of atrophy of the uterus in female rats administered in the highest dose of 10.0 mg./kg./day.

Thus, the compounds of the present invention are superior anabolic steriod without any distinct undesirable

TABLE II

| Test compound | Dose, mg./rat/day | No. of rats | Urinary nitrogen excretion Before administration mg./rat/day+s.e. | Urinary nitrogen excretion During administration mg./rat/day+s.e. | Percent retention |
|---|---|---|---|---|---|
| 7α-ethylthio-17β hydroxy-17α- methyl-5α-androstano [3,2-C] pyrazole. | 0.3 | 5 | 16.90±3.73 | 16.22±3.31 | −2.49±3.82 |
| | 1.0 | 5 | 21.31±5.12 | 15.29±3.18 | 23.72±9.79 |
| | 3.0 | 5 | 20.42±2.43 | 14.69±1.55 | 24.97±6.25 |
| 17β-hydroxy-17α-methyl-5α-androstano [3,2-C] pyrazole. | 0.3 | 5 | 19.99±5.18 | 16.06±3.84 | −4.86±1.73 |
| | 1.0 | 5 | 20.94±2.12 | 17.42±1.65 | 17.42±6.49 |
| | 3.0 | 5 | 23.94±4.25 | 18.45±1.95 | 16.12±1.85 |
| 17α-methyltestosterone. | 0.3 | 5 | 25.70±5.53 | 30.24±4.23 | −2.03±1.73 |
| | 1.0 | 5 | 21.43±1.99 | 22.90±2.03 | −1.00±3.72 |
| | 3.0 | 5 | 22.96±1.70 | 18.90±1.55 | 16.89±1.73 |

Anabolic incorporation of leucine-U—$C^{14}$ into tissue proteins

Male Donryu rats, 12 weeks old, were used. The test compounds were administered orally in doses of 0.5 and 2.0 mg./100 g. body weight/day for 10 days and leucine-U—$C^{14}$ (1 μc./100 g. body weight) was administered intravenously on the 11th day. After 3 hours of intravenous injection, peak time of leucine-U—$C^{14}$ incorporation, the animals were killed under ether anaesthesia and the $C^{14}$ activity in the proteins of liver, gastrocnemius muscle and plasma was measured by Tricarb's scintillation spectrophotometer. The comparative results are shown in Table III.

side effects. They are useful clinically for the improvement of anabolism, the increase of body weight, the promotion of growth, the increase of appetite, the potentiation of physical strength, and the stimulation of new-growth of tissue. In humans, a dosage in the range of 0.5 to 20 mg./day may be desirable. More particularly, a dosage in the range of 1.0 to 2.0 mg./day may be desirable.

The compounds of the present invention may be associated with any therapeutically acceptable solid or liquid pharmaceutical carrier which is not incompatible with the active material. Thus, compositions according to the present invention may take the form of tablets,

TABLE III

| Test compound | Dose, mg./day p.o. | No. of rats | Leucine-U-$C^{14}$ into protein-$C^{14}$/mg. protein Plasma d.p.m./mg. protein percent | Leucine-U-$C^{14}$ into protein-$C^{14}$/mg. protein Muscle, d.p.m./mg. protein percent | Leucine-U-$C^{14}$ into protein-$C^{14}$/mg. protein Liver, d.p.m./mg protein percent |
|---|---|---|---|---|---|
| Control | 0 | 5 | 133.3±6.4 (0) | 16.46±3.94 (0) | 72.6±4.5 (0) |
| 7α-ethylthio-17β-hydroxy-17α-methyl-5α-androstano [3,2-C] pyrazole. | 0.5 | 5 | 183.1±19.4 (+37.4) | 18.51±0.71 (+12.5) | 83.3±4.5 (+14.8) |
| | 2.0 | 5 | 157.7±4.5 (+18.4) | 19.06±0.81 (+15.0) | 82.2±4.1 (+13.2) |
| 17α-methyltestosterone | 0.5 | 5 | 146.2±4.6 (+9.6) | 17.64±0.68 (+7.2) | 79.9±1.2 (+10.0) |
| | 2.0 | 5 | 159.9±17.0 (+210.0) | 16.42±1.02 (0) | 78.9±3.5 (+8.8) | powders, capsules, syrups or other dosage forms particularly suitable for oral ingestion.

A preferred pharmaceutical carrier for use in the compositions according to the present invention is a lipid, from animal or vegetable sources, either in solid or liquid, form and preferably having a high coefficient of digestibility. Acceptable carriers are oils for example coconut oil, corn oil, cottonseed oil, lard oil, olive oil, peanut oil, sesame oil, soy bean oil, wheat germ oil and egg yolk oil, or fats or butters, for example butter fat, lard, cocoabutter, margarine fat and the like. Suitable lipid carriers also include mono- and diglycerides and synthetic triglycerides.

The intermediate compounds of the present invention, 7α-lower alkylthio-17β-hydroxy-2-hydroxymethylene-17α-methyl-5α-androstan-3-ones are prepared by reduction of 7α-lower alkylthio-17β-hydroxy-17α-methyl-4-androsten-3-ones with lithium in liquid ammonia, and by treatment of the resulting novel dihydro compounds, 7α-lower alkylthio - 17β - hydroxy - 17α-methyl-5α-androstan-3-ones— which also are intermediate compounds of the present invention—with an alkyl formate, for example ethyl formate, in the presence of a strong base, such as sodium hydride or sodium alkoxide in nonpolar solvent, for example benzene, at room temperature or at reflux temperature.

The 7α - lower alkylthio - 17β-hydroxy-17α-methyl-5α-androstano [3,2-C] pyrazoles of the present invention can be prepared by reacting the intermediates obtained above with an equivalent molecule of hydrazine hydrate in alcoholic solution at room temperature or at moderate temperature.

The following examples illustrate in greater detail the preparation of the compounds of the present invention.

EXAMPLE I

Preparation of 7α-ethylthio-17β-hydroxy-17α-methyl-5α-androstan-3-one

A solution of 20 g. of 7α-ethylthio-17β-hydroxy-17α-methyl-4-androstan-3-one [J. M. Krämer et al.: Chemische Berichte, Vol. 96, page 2803 (1963)] in 160 ml. of dioxane and 160 ml. of ether is added dropwise to a solution of 1540 mg. of lithium in 500 ml. of liquid ammonia over a period of 30 minutes. After stirring for an additional 40 minutes, the blue color of the solution is discharged by the addition of 26 g. of dried ammonium chloride. The excess of ammonia is evaporated at room temperature, the residue is diluted with water and the solution is extracted with ethyl acetate. The ethyl acetate extract is washed with water, dried with anhydrous sodium sulfate, and evaporated to dryness under reduced pressure leaving 33 g. of the residue. The residue is dissolved in 360 ml. of methanol and a solution of 90 g. of sodium metabisulfite in 300 ml. of water is added to the methonal solution. After stirring for 30 minutes, the resulting solution is diluted with 1500 ml. of water. The insoluble material is removed by extracting with ether. To the aqueous phase, 100 ml. of 37% aqueous formaldehyde solution is added and the mixture is heated on the waterbath for 30 minutes. The crystalline precipitate is filtered, washed with water, and dried with anhydrous sodium sulfate to give 15.0 g. of the product, melting point 147–150° C.

For analysis, the product is recrystallized from methanol-water, melting point 149–152° C.; $[\alpha]_D^{20}$ —94° (c. 0.1, chloroform); IR 3530 (—OH), 1700 (C=O).

EXAMPLE II

Preparation of 7α-ethylthio-17β-hydroxy-2-hydroxymethylene-17α-methyl-5α-androstan-3-one To a solution of 1.5 g. of 7α-ethylthio-17β-hydroxy-17α-methyl-5α-androstan-3-one (prepared as described in Example I) in 40 ml. of benzene, 4.4 ml. of ethyl formate and next 2.5 g. of 53% sodium hydride are added in an atmosphere of nitrogen. After stirring for 3 hours, the reaction mixture is allowed to stand overnight and then diluted with water to decompose the excess hydride. The resulting organic layer is separated off and the aqueous phase is washed with benzene.

The aqueous layer is then acidified with 5% hydrochloric acid and the precipitated enol is extracted with ether. The extracts are washed with water, dried with anhydrous sodium sulfate, and evaporated to dryness to give a crude material. Recrystallization from acetone-ether gives 1.55 g. of the crystalline product, melting point 168–171° C.; $[\alpha]_D^{20}$ —64.5° (c. 0.9, chloroform);

$$\lambda_{max.}^{EtOH} \ 278 \ m\mu \ (\epsilon \ 12100)$$

EXAMPLE III

Preparation of 7α-ethylthio-17β-hydroxy-17α-methyl-5α-androstano [3,2-C] pyrazole To 0.8 g. of 7α-ethylthio-17β-hydroxy - 2 - hydroxymethylene-17α-methyl-5α-androstan-3-one (prepared as described in Example II) are added 0.255 g. of 80% hydrazine hydrate and 30 ml. of 95% ethanol. The mixed solution is stirred for 4 hours. An excess of water is added to the reaction mixture and the precipitate is extracted with ether several times. The combined extracts are washed with water, dried with anhydrous sodium sulfate, and evaporated to dryness to give a crude material. Recrystallization from acetonehexane gives 0.25 g. of the desired product, melting point 151° C.; $[\alpha]_D^{20}$ —60.4° (c. 1.2, chloroform);

$$\lambda_{max.}^{EtOH} \ 224 \ m\mu \ (\epsilon \ 6500).$$

EXAMPLE IV

Preparation of 17β-hydroxy-17α-methyl-7α-methylthio-5α-androstan-3-one

According to Example I, the product is prepared in the same way from 17α-methyl-7α-methylthiotestosterone. The melting point of the product is 201–203° C.; $[\alpha]_D^{26}$ —77.0° (c. 1.6, chloroform).

EXAMPLE V

Preparation of 17β-hydroxy-17α-methyl-7α-n-propylthio-5α-androstan-3-one

According to Example I, the product is prepared in the same way from 17α-methyl-7α-n-propylthiotestosterone. The melting point of the product is 125–130° C.; $[\alpha]_D^{26}$ —79.5° (c. 1.9, chloroform).

EXAMPLE VI

Preparation of 17β-hydroxy-7α-isopropylthio-17α-methyl-5α-androstan-3-one

According to Example I, the product is prepared in the same way from 7α-isopropylthio-17α-methyltestosterone. The melting point of the product is 185–188° C.; $[\alpha]_D^{26}$ —38.3° (c. 1.9, chloroform).

EXAMPLE VII

Preparation of 7α-n-butylthio-17β-hydroxy-17α-methyl-5α-androstan-3-one

According to Example I, the product is prepared in the same way from 7α-n-butylthio-17α-methyltestosterone. The melting point of the product is 114–117° C.; $[\alpha]_D^{26}$ —82.6° (c. 1.2, chloroform).

EXAMPLE VIII

Preparation of 17β-hydroxy-2-hydroxymethylene-17α-methyl-7α-methylthio-5α-androstan-3-one According to Example II, the product is prepared in the same way from 17β-hydroxy-17α-methyl-7α-methylthio-5α-androstan-3-one (prepared as described in Example IV). The melting point of the product is 189–192° C.; $[\alpha]_D^{26}$ —53.2° (c. 1.3, chloroform);

$$\lambda_{max.}^{EtOH} \ 283 \ m\mu \ (\epsilon \ 9,300)$$

EXAMPLE IX

Preparation of 17β-hydroxy-2-hydroxymethylene-17α-methyl-7α-n-propylthio-5α-androstan-3-one According to Example II, the product is prepared in the same way from 17β-hydroxy-17α-methyl-7α-n-propylthio-5α-androstan-3-one (prepared as described in Example V). The melting point of the product is 197–200° C.; $[\alpha]_D^{26}$ —70.5° (c. 1.2, chloroform).

$\lambda_{max.}^{EtOH}$ 285 mμ (ε, 9,100)

EXAMPLE X

Preparation of 17β-hydroxy-2-hydroxymethylene-7α-isopropylthio-17α-methyl-5α-androstan-3-one According to Example II, the product is prepared in the same way from 17β-hydroxy-7α-isopropylthio-17α-methyl-5α-androstan-3-one (prepared as described in Example VI). The melting point of the product is 186–188° C.; $[\alpha]_D^{26}$ —69.0° (c. 1.5, chloroform);

$\lambda_{max.}^{EtOH}$ 280 mμ (ε, 11,500)

EXAMPLE XI

Preparation of 7α-n-butylthio-17β-hydroxy-2-hydroxymethylene-17α-methyl-5α-androstan-3-one According to Example II, the product is obtained in the same way from 7α-n-butylthio-17β-hydroxy-17α-methyl-5α-androstan-3-one (prepared as described in Example VII). The melting point of the product is 187–190° C.; $[\alpha]_D^{26}$ —64.9° (c. 1.4, chloroform);

$\lambda_{max.}^{EtOH}$ 281 mμ (ε, 10,200)

EXAMPLE XII

Preparation of 17β-hydroxy-17α-methyl-7α-methylthio-5α-androstano [3,2-C] pyrazole In an analogous manner described in Example III, there are reacted 1 g. of 17β-hydroxy-2-hydroxymethylene - 17α-methyl-7α-methylthio-5α-androstan-3-one (prepared as described in Example VIII) with 0.35 g. of 80% hydrazine hydrate in 20 ml. of 95% ethanol to obtain 0.7 g. of the product, melting point 155–158° C.; $[\alpha]_D^{26}$ —39.0° (c, 1.3, chloroform);

$\lambda_{max.}^{EtOH}$ 224 mμ (ε, 4,700)

EXAMPLE XIII

Preparation of 17β-hydroxy-17α-methyl-7α-n-propylthio-5α-androstano [3,2-C] pyrazole According to Example III, the product is obtained in the same way from 17β-hydroxy-2-hydroxymethylene-17α - methyl - 7α - n - propylthio - 5α - androstan-3-one (prepared as described in Example IX). The melting point of the product is 135–136° C.; $[\alpha]_D^{26}$ —54.0° (c, 1.9, chloroform);

$\lambda_{max.}^{EtOH}$ 225 mμ (ε, 5,000)

EXAMPLE XIV

Preparation of 17β-hydroxy-7α-isopropylthio-17α-methyl-5α-androstano [3,2-C] pyrazole According to Example III, the product is prepared in the same way from 17β-hydroxy-2-hydroxymethylene-7α-isopropylthio-17α-methyl-5α-androstan-3-one (prepared as described in Example X). The melting point of the product is 152–155° C.; $[\alpha]_D^{26}$ —54.2° (c, 1.5, chloroform);

$\lambda_{max.}^{EtOH}$ 225 mμ (ε, 4,900)

EXAMPLE XV

Preparation of 7α-n-butylthio-17β-hydroxy-17α-methyl-5α-androstano[3,2-C]pyrazole According to Example III, the product is obtained in the same way from 7α-n-butylthio-17β-hydroxy-2-hydroxymethylene-17α-methyl-5α-androstan-3-one (prepared as described in Example XI). The melting point of the product is 130–134° C.; $[\alpha]_D^{26}$ —53.8° (c, 1.0, chloroform);

$\lambda_{max.}^{EtOH}$ 225 mμ (ε, 4,800)

What is claimed is:
1. A compound 7α-lower alkylthio-17β-hydroxy-17α-methyl-5α-androstano [3,2-C] pyrazole.
2. The compound 17β-hydroxyl-17α-methyl-7α-methylthio-5α-androstano [3,2-C] pyrazole.
3. The compound 7α - ethylthio - 17β - hydroxy - 17α-methyl-5α-androstano [3,2-C] pyrazole.
4. The compound 17β - hydroxy - 17α - methyl - 7α - n-propylthio-5α-androstano [3,2-C] pyrazole.
5. The compound 17β-hydroxy-7α-isopropylthio-17α-methyl-5α-androstano [3,2-C] pyrazole.
6. The compound 7α - n - butylthio - 17β-hydroxy-17α-methyl-5α-androstano [3,2-C] pyrazole.
7. A pharmaceutical composition for oral ingestion comprising as the principal therapeutic agent 7α-lower alkylthio-17β-hydroxy-17α-methyl-5α-androstano [3,2-C] pyrazole and a nontoxic lipid carrier.
8. A pharmaceutical composition for oral ingestion comprising as the principal therapeutic agent 7α-ethylthio-17β-hydroxy-17α-methyl-5α-androstano [3,2-C] pyrazole and a nontoxic lipid carrier.

References Cited

UNITED STATES PATENTS 3,074,932   1/1963   Schaub et al. _____ 260—239.5

HENRY A. FRENCH, Primary Examiner

U.S. Cl. X.R.

260—239.5, 397.4